(12) United States Patent
Newville (10) Patent No.: US 10,859,201 B2
(45) Date of Patent: Dec. 8, 2020

(54) DISPLAY MOUNT ASSEMBLY

(71) Applicant: MANEHU PRODUCT ALLIANCE, LLC, Carlsbad, CA (US)

(72) Inventor: Brian Newville, San Diego, CA (US)

(73) Assignee: Manehu Product Alliance, LLC, Carlsbad, CA (US)

( * ) Notice: Subject to any disclaimer, the term of this patent is extended or adjusted under 35 U.S.C. 154(b) by 19 days.

(21) Appl. No.: 16/375,835

(22) Filed: Apr. 4, 2019

(65) Prior Publication Data
US 2019/0309895 A1    Oct. 10, 2019

Related U.S. Application Data

(60) Provisional application No. 62/655,805, filed on Apr. 10, 2018.

(51) Int. Cl.
| | |
|---|---|
| *F16M 11/18* | (2006.01) |
| *F16M 13/02* | (2006.01) |
| *F16M 11/04* | (2006.01) |
| *F16M 11/08* | (2006.01) |

(52) U.S. Cl.
CPC ........... *F16M 11/18* (2013.01); *F16M 11/046* (2013.01); *F16M 11/048* (2013.01); *F16M 11/08* (2013.01); *F16M 13/02* (2013.01); *F16M 2200/063* (2013.01)

(58) Field of Classification Search
CPC .. F16M 11/18; F16M 11/0216; F16M 11/048; F16M 11/08; F16M 13/02; F16M 2200/063
See application file for complete search history.

(56) References Cited

U.S. PATENT DOCUMENTS

| | | | | |
|---|---|---|---|---|
| 8,864,092 | B2* | 10/2014 | Newville | F16M 11/08 248/123.11 |
| 9,004,430 | B2* | 4/2015 | Conner | F16M 11/08 248/277.1 |
| 9,625,091 | B1* | 4/2017 | Massey | F16M 11/10 |
| 2012/0032062 | A1* | 2/2012 | Newville | F16M 11/2092 248/575 |
| 2019/0072231 | A1* | 3/2019 | Newville | F16M 11/18 |

* cited by examiner

*Primary Examiner* — Anita M King
(74) *Attorney, Agent, or Firm* — Perkins Coie LLP (57) ABSTRACT

A device for wall mounting television or another display includes a wall mounting portion, a display mounting portion, and an extending/contracting portion. The extending/contracting portion includes a lower arm, an upper arm, a front bracket, a wall mounting bracket, one or more gas springs, and a linear actuator. The one or more gas springs and the linear actuator are arranged selectively to retract and extend the display mounting portion. The lower arm includes protrusions for automatically straightening a display attached to the display mounting portion. The display mounting portion and the extending/contracting portion together include a mechanism for automatically adjusting azimuth of the display mounting portion to a pre-set position when the display mounting portion is lowered into a viewing position. The mechanism for automatically adjusting azimuth may include a set screw and a biasing spring.

21 Claims, 4 Drawing Sheets

DISPLAY MOUNT ASSEMBLY

CROSS-REFERENCE TO RELATED APPLICATION

This application claims priority to U.S. Provisional Application Ser. No. 62/655,805, entitled DISPLAY MOUNT ASSEMBLY, filed on 10 Apr. 2018, which is hereby incorporated by reference in its entirety as if fully set forth herein, including Specification, Figures, Claims, and all other matter.

FIELD OF THE INVENTION

This document generally relates to the field of retractable/extendable mounts for appliances. More particularly, this document relates to retractable wall mounts for displays such as television sets (TVs).

BACKGROUND

A good mounting place for a large flat screen display (such as a TV) is often high on a wall, for example, above a fireplace. Such mounting location may make it necessary or desirable to lower the display for watching from a convenient location in a room. In the course of lowering the TV, it may need to clear an obstacle, for example, a fireplace mantel below the mounting location. The force for lowering and raising the TV may be provided, for example, manually, by gas springs, and by linear actuators.

Typically, when the TV is raised, it should be flat or substantially flat against the wall, so that it will not protrude and become an obstacle and so that one of its sides will not crash into the wall and cause damage to the appliance itself and/or the wall. At the same time, it is desirable to allow convenient watching of the TV from some angle, that is, for watching positions that are not necessarily right in front of the wall mount. Towards this end, a swiveling mechanism may be included to provide for right-left swiveling with respect to the TV's vertical axis. Borrowing from aeronautics (Tait-Bryan angles) and analogizing the TV to an aircraft with its nose pointing in the direction normal to the screen and pointing in the viewer's direction, the swiveling would provide yaw or heading adjustment; we can alternatively call one of the angles that the axis normal to screen would form with an axis normal to the wall (and at the same vertical level as the axis normal to the screen) an "azimuth," "azimuth angle." "swivel position," or "swivel angle."

As has already been mentioned, the TV may be flat or substantially flat (not noticeably different from flat) against the wall in the retracted position, and possibly at some azimuth angle when extended for viewing. But for better viewing from the retracted position, the TV may be angled slightly forward. It is generally preferable, however, for the TV to be retracted so that the azimuth is close to zero, thereby preventing one side (left or right) from crashing into the wall on which the TV mounting assembly is mounted.

U.S. Pat. No. 8,864,092 (the "'092 patent"), Brian Newville inventor, is incorporated by reference herein in its entirety, including claims and all other matter. The '092 patent describes an "auto-straightening" mechanism with lower arm perpendicular protrusions that automatically straighten a TV as the wall mount retracts the TV towards the mounting wall. When a user manually pulls the TV on the mount with the auto-straightening mechanism, the user can manually adjust the swivel for the desired azimuth, for convenient viewing angle. This is inconvenient. If the retraction/extension function of the wall mount is automated (power-assisted) and remote-controlled, the user may still need to adjust the swivel after the wall mount extends the display or TV from the wall into the viewing position. This is also inconvenient.

SUMMARY

A need in the art exists for new and better techniques for mounting various devices, including displays and TVs. A need in the art exists for more convenient manual and power-assisted wall mounts for displays and TVs. A need in the art exists for manual and power-assisted wall mounts that do not require the user to adjust the azimuth from the straightforward or random direction, after each extension.

Embodiments, variants, and examples described in this document are directed to apparatus and methods that may satisfy one or more of the above described needs and/or other needs.

In an embodiment, a mounting device includes a wall mounting portion, a display mounting portion, and an extending/contracting portion. The extending/contracting portion includes a lower arm, an upper arm, a front bracket, a wall mounting bracket, one or more gas springs, and a linear actuator. The one or more gas springs and the linear actuator are arranged selectively to retract and extend the display mounting portion. The lower arm includes protrusions for automatically straightening a display attached to the display mounting portion. The display mounting portion and the extending/contracting portion together include a mechanism for automatically adjusting azimuth of the display mounting portion to a pre-set position when the display mounting portion is lowered into a viewing position. The mechanism for automatically adjusting azimuth may include a set screw and a biasing spring.

In an embodiment, a mounting device includes a wall mounting portion configured to be attached to a wall; a display mounting portion; and an extending/contracting portion between the wall mounting portion and the display mounting portion. The display mounting portion is configured to receive and support a display so that the display faces away from the wall. The extending/contracting portion is configured to allow the display mounting portion to move up and towards the wall, and down and away from the wall. The display mounting portion is attached to the extending/contracting portion so that the display mounting portion can swivel horizontally. The extending/contracting portion includes an adjustably-extending component setting a predetermined azimuth of the display mounting portion and a biasing component configured to bias the display mounting portion against the adjustably-extending component at the predetermined azimuth. The adjustably-extending component and the biasing component automatically set the display mounting portion to a predetermined azimuth in response to the display mounting portion being lowered and moved away from the wall, and allow the display mounting portion to move towards a position parallel to the wall when the display mounting portion is raised and moved towards the wall.

In aspects, the extending/contracting portion includes a front mounting bracket that does not swivel with the display mounting portion, the front mounting bracket includes a first surface having portions defining a first hole on a first side off center of the first surface, the mounting device further includes a vertical center rod that attaches the display mounting portion to the front mounting bracket so that the display mounting portion can swivel horizontally, and the adjustably-extending component extends through the first hole so that the adjustably-extending component can be adjusted to protrude through the first hole away from the wall at variable length that sets the predetermined azimuth.

In aspects, the adjustably-extending component is a set screw and one or more nuts. The variable length of the adjustably-extending component protruding through the first hole can be adjusted by turning the set screw and the one or more nuts relative to each other, thereby adjusting the predetermined azimuth.

In aspects, the mounting device also includes a plurality of pegs with different lengths. Each of the pegs of the plurality of pegs is insertable into and fixable in the first hole, wherein the adjustably-extending component comprises a selected peg of the plurality of pegs inserted into the first hole and fixed into the first hole. In this way, the variable length of the adjustably-extending component protruding through the first hole can be adjusted by the user/installer selecting the selected peg, thereby adjusting the predetermined azimuth.

In aspects, the portions defining the first hole have a female thread, and the adjustably-extending component includes a set screw with a male thread matching the female thread of the first hole, so that the variable length of the adjustably-extending component protruding through the first hole can be adjusted by turning the set screw, thereby adjusting the predetermined azimuth.

In aspects, the biasing component is an elastic band having a first end attached to the front mounting bracket on the first side and a second end attached to the display mounting portion on the first side, the elastic band being in extended state to bias the display mounting portion to swivel to the first side.

In aspects, the biasing component includes a spring having a first end attached to the front mounting bracket on the first side and a second end attached to the display mounting portion on the first side, the spring being in extended state to bias the display mounting portion to swivel to the first side.

In aspects, the spring is a coil spring operating in tension mode.

In aspects, the spring is a leaf spring.

In aspects, the spring is a volute spring.

In aspects, the spring is a V-spring.

In aspects, the spring is a torsion spring.

In aspects, the spring is a gas spring.

In aspects, the first surface also has a female-threaded hole off center on a second side of the first surface, the second side being horizontally opposite to the first side.

In aspects, the extending/contracting portion also includes: a lower arm with a first lower arm end and a second lower arm end; an upper arm with a first upper arm end and a second upper arm end; a wall mounting bracket rigidly attached to the wall mounting portion; a gas spring to support the display mounting portion, the gas spring having a first gas spring end and a second gas spring end; and a linear actuator with a first actuator end and a second actuator end. The gas spring and the linear actuator are arranged to retract and extend the display mounting portion selectively. The lower arm has protrusions to automatically straighten the display mounting portion when the extending/contracting portion contracts to lower the display mounting portion.

In aspects, the extending/contracting portion also includes a plurality of attachment axles. The upper arm is attached to the wall mounting portion at the first upper arm end with at least a first attachment axle of the plurality of attachment axles to allow the upper arm to rotate around the first attachment axle when the display mounting portion is raised and lowered. The lower arm is attached to the wall mounting portion at the first lower arm end with at least a second attachment axle of the plurality of attachment axles to allow the lower arm to rotate around the first attachment axle when the display mounting portion is raised and lowered. The upper arm is attached at the second upper arm end to the front mounting bracket with at least a third attachment axle of the plurality of attachment axles to allow the upper arm to rotate around the third attachment axle when the display mounting portion is raised and lowered. And the lower arm is attached at the second lower arm end to the front mounting bracket with at least a fourth attachment axle of the plurality of attachment axles to allow the lower arm to rotate around the fourth attachment axle when the display mounting portion is raised and lowered.

In aspects, the first actuator end is attached to the wall mounting portion at a first attachment point, and to the display mounting portion at a second attachment point; the linear actuator can rotate around the first attachment point and rotate around the second attachment point when the display mounting portion is raised and lowered; the first gas spring end is attached to the wall mounting portion at a third attachment point, and to the display mounting portion at a fourth attachment point; and the gas spring can rotate around the third attachment point and rotate around the fourth attachment point when the display mounting portion is raised and lowered.

In aspects, the embodiment also includes a remote control receiver configured to receive signals from a remote control unit and operate the linear actuator in response to the signals.

In aspects, the embodiment also includes the remote control unit, and the remote control receiver and the remote control unit operate using signals selected from the group consisting of radio frequency signals, infrared signals, and ultrasound signals.

These and other features and aspects of selected embodiments, variants, and examples consistent with the present disclosure will be better understood with reference to the following description, drawings, and appended claims.

DETAILED DESCRIPTION

Reference will be made in detail to one or more embodiments that are illustrated in the accompanying drawings, their features, and alternative embodiments. Same reference numerals are used in the drawings and the description to refer to the same apparatus elements and method steps (if applicable). The drawings are in simplified form, not necessarily to scale, and omit apparatus and articles of manufacture elements and method steps that can be added to the described apparatuses, articles of manufacture, and methods, while including certain optional elements and steps. For purposes of convenience and clarity, directional terms, such as top, bottom, left, right, up, down, over, above, below, beneath, rear, and front, may be used with respect to the accompanying drawings. These and similar directional terms should not be construed to limit the scope of the invention in any manner. The reference to "right" and "left" in describing the drawings are generally intended to refer to, respectively, the right side and left side of a user standing in front of the TV and facing the TV, in a viewing position. The description of each Figure should be interpreted in conjunction with the Figure itself and with the other related Figures.

The words such as "connect," "couple," "attach," and similar terms with their inflections do not necessarily denote direct and immediate connections/attachments; they include within their meaning direct/immediate connections, couplings, and attachments; and also connections, couplings, attachments using intermediate elements or devices. This applies to electrical/electronic and mechanical items.

The words "embodiment," "variant," "example," and similar words and expressions as used herein refer to a particular apparatus, process, or article of manufacture, and not necessarily to the same apparatus, process, or article of manufacture. Thus, "one embodiment" (or a similar expression) used in one place or context may refer to a particular apparatus, process, or article of manufacture; the same or a similar expression in a different place or context may refer to a different apparatus, process, or article of manufacture. The expression "alternative embodiment" and similar words and phrases are used to indicate one of a number of different possible embodiments, variants, or examples. The number of possible embodiments, variants, or examples is not necessarily limited to two or any other quantity. Characterization of an item as "exemplary" means that the item is used as an example. Such characterization does not necessarily mean that the embodiment, variant, or example is a preferred one; the embodiment, variant, or example may but need not be a currently preferred embodiment, variant, or example. All embodiments, variants, and examples are described for illustration purposes and do not necessarily strictly limit the invention(s) disclosed.

Some definitions have been explicitly provided above. Other and further explicit and implicit definitions and clarifications of definitions may be found throughout this document.

Figure 1:
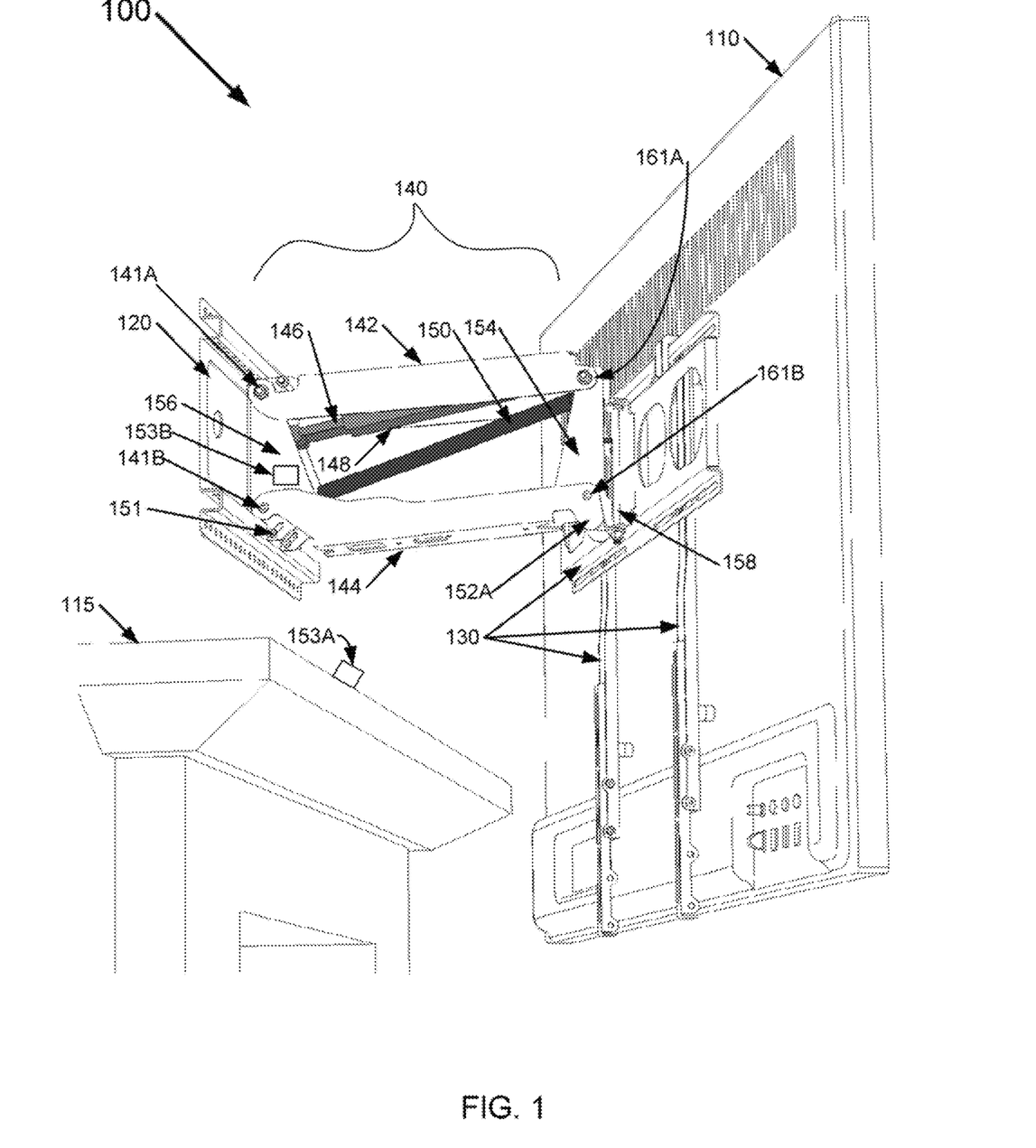
FIG. 1 is a left-side perspective view illustrating selected components of a wall mount assembly for displays.

FIG. 1 is a left-side perspective view illustrating selected components of a wall mount assembly 100. The wall mount assembly 100 includes three major sets of components: a wall mounting portion 120, which is attached to a wall above a fireplace 115; a display mounting portion 130 with a TV 110 mounted on its front; and an extending/contracting portion 140 between the wall mounting portion 120 and the display mounting portion 130. The extending/contracting portion 140 is shown in the extended configuration, with the TV 110 away from the wall. The extending/contracting portion 140 may lower the TV 110 further, and raise it above the fireplace, to be close to the wall (flat or substantially flat with the wall, possibly slightly angling forward). As shown in FIG. 1, the TV 110 is swiveled somewhat to the right.

The extending/retracting portion 140 includes an upper arm 142, a lower arm 144, a wall mounting bracket 156, a front bracket 154, gas (pneumatic) springs 146 on the left and 148 on the right, and a linear actuator 150. Note that the lower arm 144 includes a protrusion 152A on the right; a similar protrusion 152B exists on the opposite side of the lower arm 144, as will be shown in other Figure(s) described below.

The upper arm 142 and the lower arm 144 are attached to the wall mounting bracket 156 with rear axles 141A and 141B, respectively, and can rotate relative to the wall mounting bracket 156 about their respective axles, within limited ranges. The rotation ranges are sufficient to lower the TV 110 into various positions and raise the TV 110 to the wall, above the wall mounting portion 120. The lower end of the ranges may be adjustable, for examples, by moving the bolt/nut combinations 151 in the slots on each side of the wall mounting bracket 156. The rear axles 141A/141B may be, for example, rods or bolts capped with nuts on their ends. There may be one such axle of attachment per one of the arms 141 or 142, meaning that the axle goes through its respective arm from one side to the other and provides support/attachment on both sides (right and left) of the respective arm; there may also be two such rear axles per one of the respective arms 141 or 142, meaning that the rear axle goes through only one side of its respective arm 141 or 142 and provides support only on one side (left or right). In embodiments, one of the arms 141/142 is attached to the wall mounting bracket 156 with a single rear axle, while the other arm 142/141 is attached to the wall mounting bracket 156 with two shorter rear axles, one per side. The wall mounting bracket 156 may be attached to the wall mounting portion 120 with various means, for example, screws, nuts, or welds.

The upper arm 142 and the lower arm 144 are also attached to the front bracket 154 with axles 161A and 161B, respectively, and can rotate relative to the front bracket 154 about their respective axles. This arrangement and its variants may be analogous to the attachment of the arms 141/142 to the wall mounting bracket 156.

The gas springs 146/148 and the linear actuator 150 are attached to the wall mounting bracket 156 on one end. For example, the gas springs 146/148 may be attached to the wall mounting bracket 156 directly or with a spring block, which may be adjustable in the vertical dimension (with a calibration screw, for example) for varying the force provided by the gas springs 146/148 and accommodating displays of varying weight. The linear actuator 150 may be attached to the wall mounting bracket 156 directly or with an actuator block that allows some adjustment. On the other end, proximate the front bracket 154, the gas springs 146/148 and the linear actuator 150 are attached to the upper arm 142.

A rod 158 capped on the upper and lower ends attaches the display mounting portion 130 to the front bracket 154, allowing the display mounting portion 130 and the TV 110 attached to it to swivel right-left. The Figures show a single vertical rod 158. Two or more concentric vertical rods can be used in its place; for example, the display mounting portion 130 may be attached to the front bracket 154 with two shorter vertical concentric rods with a vertical space in-between them, to allow the display mounting portion 130 to swivel right-left. One of the two shorter vertical concentric rods may be towards the bottom of the display mounting portion 130, the other towards the top. There may be more than two such vertical concentric rods, for example, three, four, or even more. Note also that the rod (or rods, as the case may be) is/are vertical when the display mounting portion 130 and the TV 110 point horizontally and are not angled/tilted low or high. (In the present context, the display mounting portion 130 and the TV 110 "point" in the direction normal to the screen of the TV 110, away from the wall.) Thus, the rod(s) may not be exactly vertical at all times, though it/they may be vertical or substantially vertical when the display mounting portion 130 and the TV 110 are retracted and pulled flat against the wall.

In the fully-retracted position, the weight of the TV 110 (or another display in its place) is supported entirely or partially by the gas springs 146/148, and the wall mount assembly 100 may thus remain in this position without application of additional forces. To extend/lower the TV 110, the linear actuator 150 is activated to cause it to shorten and thereby pull the TV 110 down and away from the wall, as the upper arm 142 and the lower arm 144 rotate about their respective axles 141A and 141B; from the extended position, lengthening of the actuator 150 pushes the TV 110 up and nearer the wall. Note that the linear actuator 150 is mounted on the wall mounting bracket 156 lower than the gas springs 146/148. The geometry of the wall mount assembly 100 is, therefore, such that the shortening of the linear actuator 150 causes the TV 110 to extend from the wall and be lowered; and vice versa, the lengthening of the linear actuator 150 raises the TV 110 and moves it closer to the wall.

Figure 2:
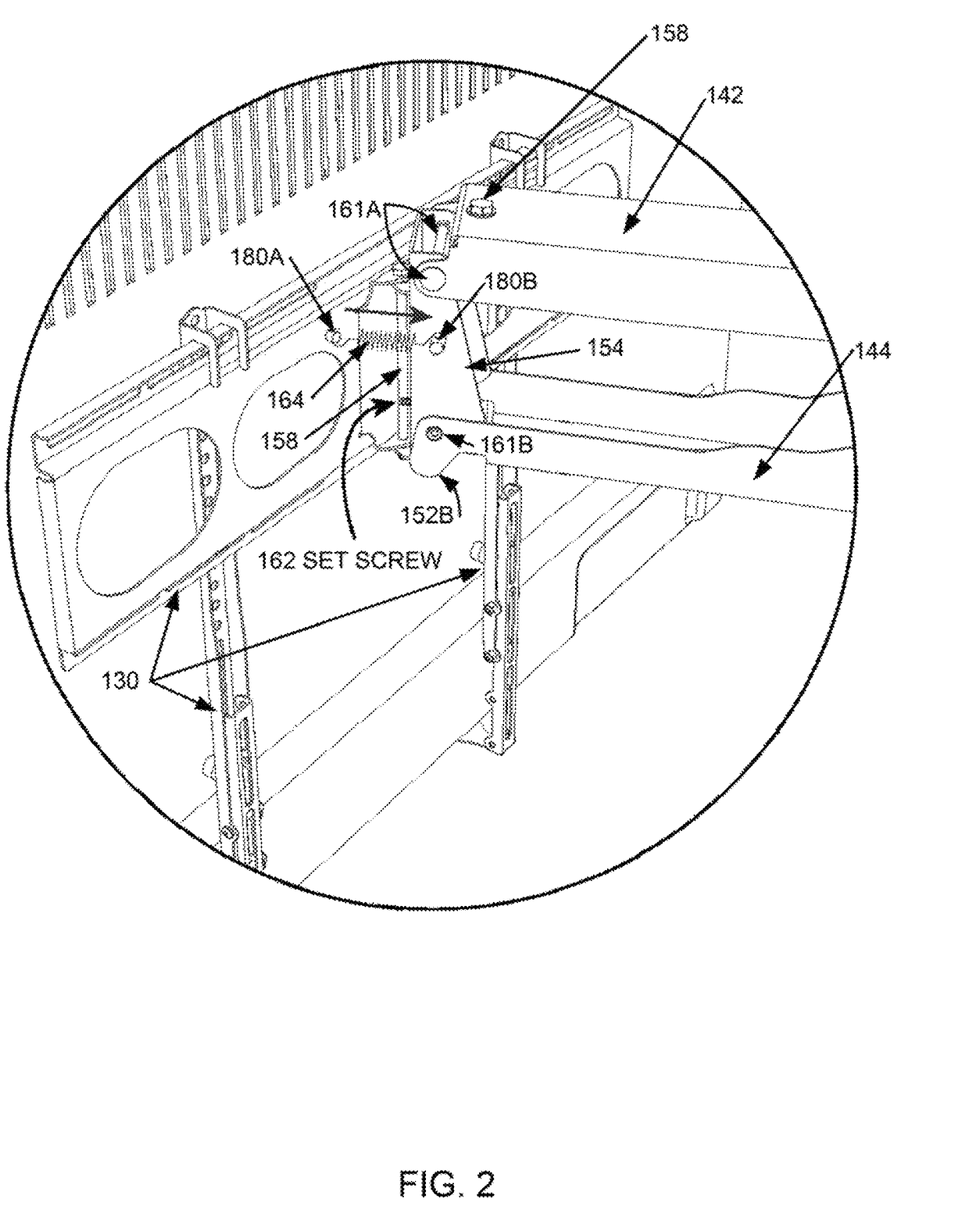
FIG. 2 is a partial right-side perspective view illustrating selected components of the wall mount assembly of FIG. 1.

FIG. 2 is a partial right-side perspective view illustrating selected components of the wall mount assembly 100. The protrusion 152B on this side of the lower arm 144 (mentioned earlier) is visible in the Figure.

Note the set screw 162 that protrudes forward (away from the wall, toward the user/viewer) from the front bracket 154. The set screw 162 is user- and/or installer-adjustable, allowing for varying the length it protrudes forward from the front bracket 154. It is located off the (vertical) centerline of the front bracket 154, to the right side, so that it prevents the TV from swiveling to the right beyond the point where the protruding end of the set screw 162 makes contact with the swiveling display mounting portion 130, thus limiting the swiveling angle of the TV to the right. As the name implies, the set screw 162 may have a thread, and the hole in the front bracket through which the set screw 162 protrudes may have a matching thread. In embodiments, the hole diameter may be about the same as or somewhat larger than the diameter of the shaft of the set screw, and a nut with a matching thread or a similar device may be attached to one side of the front bracket concentric with the hole, to allow the set screw to protrude through the nut and the hole, and to allow the protruding portion of the set screw to be adjusted by rotating the set screw in the hole/nut; in such embodiments, the nut may be considered to be part of the front bracket. Such arrangement can be seen in FIG. 3, described below.

Figure 4:
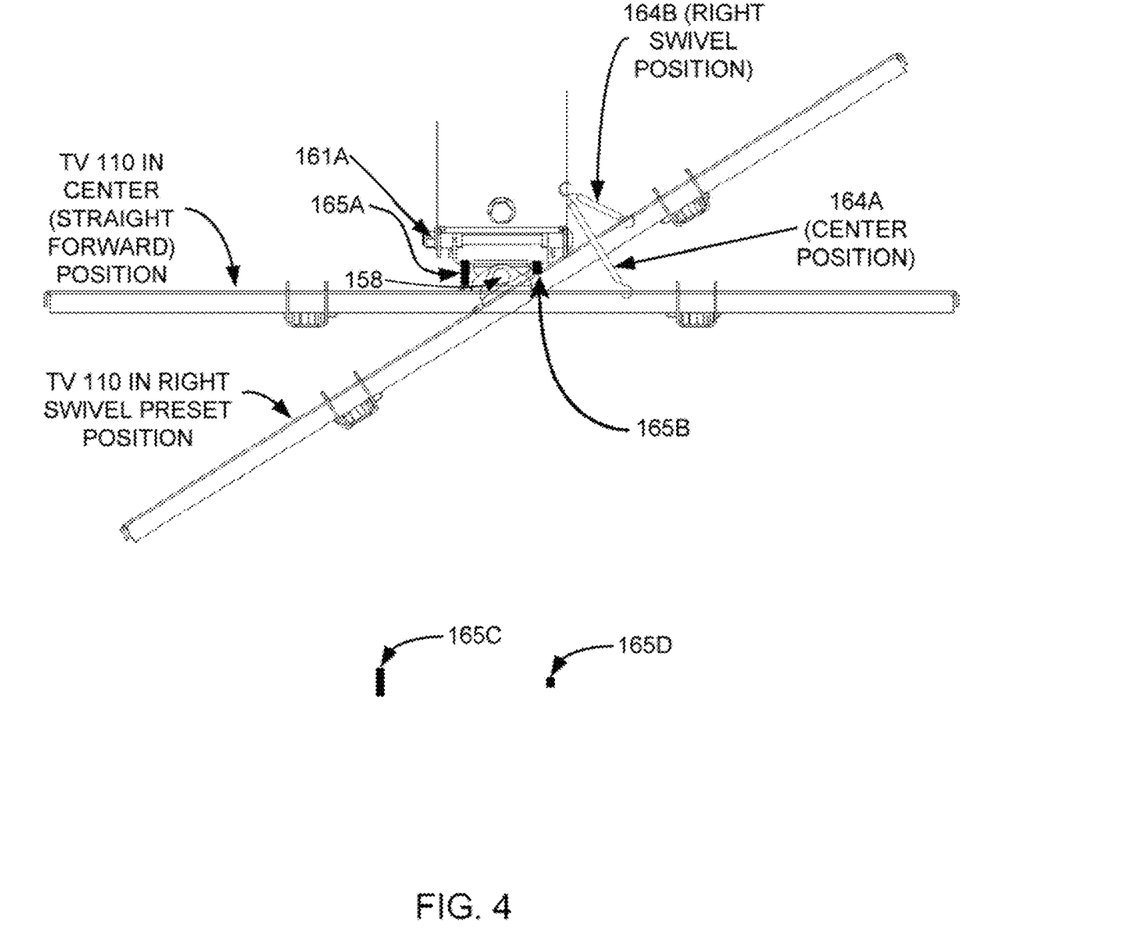
FIG. 4 is a top view of the wall mount assembly using pegs of different lengths to preset the angle of the display and various biasing devices, with the display in a center position and in a right swivel position.

Other techniques of adjusting the length of the protruding portion may be used as well. As is illustrated in FIG. 4, in some embodiments, the wall mount assembly 100 may come with multiple pegs 165A, 165B, 165C, and 165D of various lengths; the pegs 165A/B/C/D are insertable into the hole in the front bracket 154 and fixed therein, by the user and/or installer, thereby selecting the length of the protruding portion and determining the azimuth of the display mounting portion 130 and the TV 110 when the extending/contracting portion 140 is extended. In some embodiments, nuts on the opposite end of a set screw or a threaded rod (similar to a screw but possibly without a screw cap) may be used by the user/installer to select the length of the protruding portion and thereby determine the azimuth of the display mounting portion 130 and the TV 110 when the extending/contracting portion 140 is extended.

Note also a biasing spring 164 that is attached to the swiveling display mounting portion 130 on its right side and to the non-swiveling front bracket 154. The attachment means shown in the Figure are small posts 180A and 180B protruding, respectively, from the display mounting portion 130 and the front bracket 154, each of the posts having a small hole; other attachment means are contemplated, such as holes made directly in the display mounting portion 130 and the front bracket 154, hooks or screws on the 130/154, welding points, and others.

The arrow above the spring 164 indicates that the spring 164 is extended, pulling the right side of the display mounting portion 130 and biasing it to swivel to the right until it contacts and is stopped by the set screw 162. In operation, once the display mounting portion 130 is extended/lowered into the viewing position, it will swivel under the action of the spring 164 until it is stopped by the protruding set screw 162. Recall that the set screw 162 is adjustable, so that the viewing azimuth can be set to the user's preference as part of the installation or later. In embodiments, the set screw 162 may be quite long and extended so that the selected viewing position is towards the left side, despite the spring 164 and the set screw 162 being located on the right side. When the wall mount assembly 100 is retracted/raised, the auto-straightening mechanism (the protrusions 152A and 152B, possibly including small wheels, as is described in the '092 patent) overcomes the force of the spring 164 and straightens the TV 110 so that is can be held evenly against the wall (flat or with a small angle to the front).

In the illustrated embodiment of FIG. 1 and FIG. 2, the mechanism for automatically adjusting the swivel position (azimuth) to the pre-set position (including the set screw 162, the biasing spring 164, and the posts 180A/180B) is shown on the right side. As a person of average skill in the art would understand after careful perusal of this document and the Figures, an analogous mechanism for automatically adjusting the swivel position may be located on the left side, with changes necessitated by the left-side location. Thus, the small posts 180A/180B for attaching the biasing spring (or other means for biasing spring attachment) may be located on the left side of the display mounting portion 130 and on the left side of the front bracket 154; and a set screw may protrude forward from the front of the front surface bracket 154 through a hole that is also on the left side of the front surface of the front bracket 154.

Figure 3:
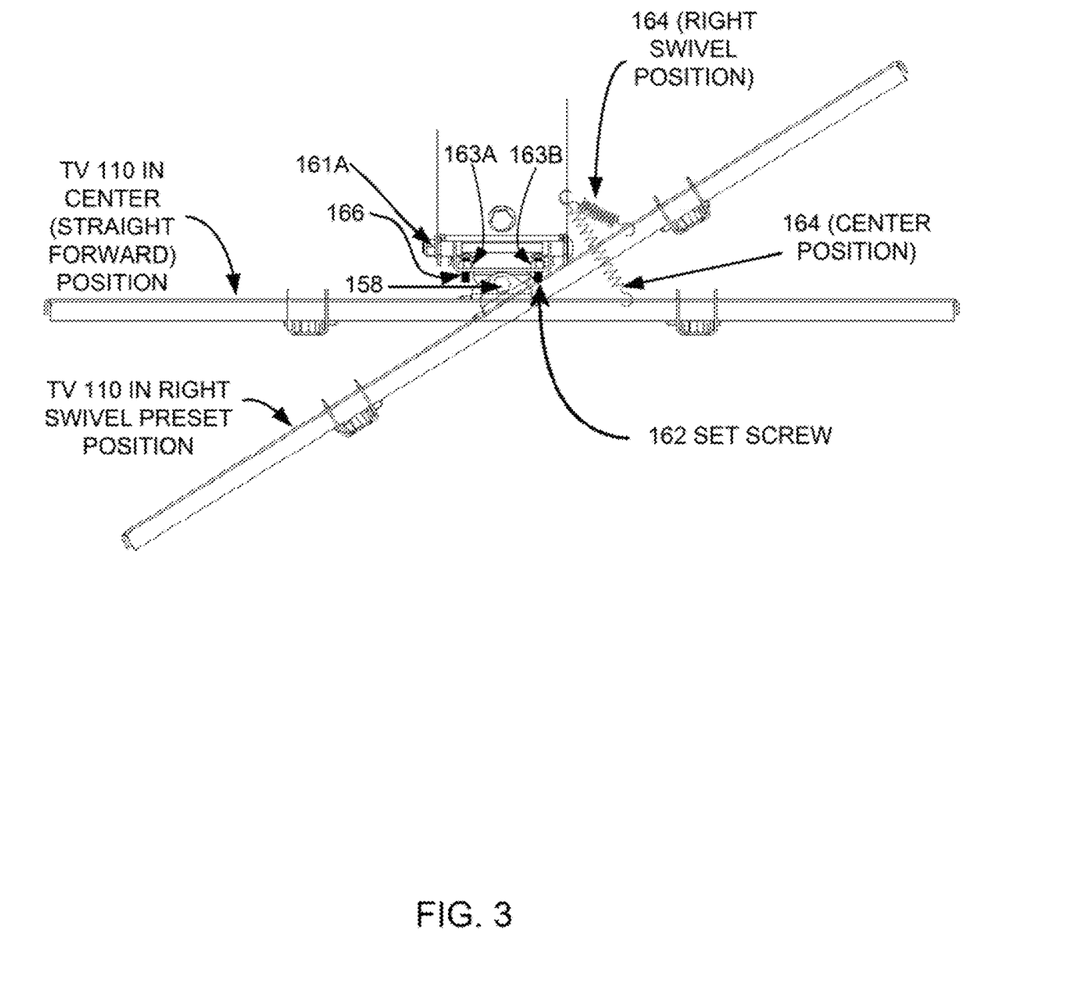
FIG. 3 is a top view of the wall mount assembly of FIGS. 1 and 2 with the display in a center position and in a right swivel position.

In embodiments, there are holes on both sides of the front surface of the front bracket 154, and the small posts or other means for selectively attaching the biasing spring are also provided on both sides. The placement of two set screws is illustrated in FIG. 3, which is a top view of the wall mount assembly 100 with the TV 110 in two positions: (1) a straightforward position (as would be the case if the preselected viewing azimuth is center, with no swivel to either side, or when retracted flat against the wall); and (2) the right swivel position. Note a second set screw 166 on the left. It is not used here for setting the preferred swivel angle for watching the TV 110, but may be used to limit the swivel to the left, for example, to avoid striking the TV 110 against the wall or another obstacle. The installer or the user may attach the biasing spring on the preferred side, and adjust the set screw on the same or opposite side for the desired swivel position. (Recall that with sufficient length of the operative set screw, the set screw and the biasing spring may be used, in some embodiments, for either side viewing, as has been described above.) Note also nuts 163A and 163B, attached on the inner side of the front surface of front bracket 154; these nuts are threaded and may be considered as the parts of the threaded portions of the front bracket 154, as has already been mentioned above. Again, other techniques of adjusting the length of the protruding portion of the set screw may be used as well, on either or both sides.

The mechanism for automatically adjusting the swivel position described so far employs a coil spring operating in a tension mode. In embodiments, however, the biasing spring may operate in a compression mode. For example and referencing FIG. 2, a compression mode spring may be located on the left side, instead of the illustrated tension mode biasing spring 164 shown on the right side. Moreover, the biasing spring need not be a coil spring; it may be a leaf spring, a V-spring, a torsion spring, a volute spring, a gas spring, or another type of spring. In fact, a rubber hand may, be used, for example, substituted for the tension biasing spring 164. Other devices that apply force (e.g., pulling, pushing) may also be used. In FIG. 4, the labeled rectangular boxes 164A and 164B denote such biasing devices (e.g., a leaf spring, a V-spring, a torsion spring, a volute spring, a gas spring, another type of spring, an elastic band) with the display mounting portion 110 in the center position and a right swivel position, respectively.

In embodiments, the wall mount assembly 100 may include a remote control unit 153A (illustrated in FIG. 1 as a labeled rectangular box) and a receiver 153B (also illustrated in FIG. 1 as a labeled rectangular box) of the remote control unit 153A connected to the linear actuator 150, to allow the user remotely to extend/lower the display (e.g., the TV 110) to the viewing position and/or retract/raise the display to the storage position near the wall above the fireplace. The remote control unit 153A may communicate with the receiver 153B using, for example, radio frequency (RF) signals, infrared (IR) signals, and ultrasound signals. Through the remote control unit 153A, the user can selectively power the linear actuator 150 to cause it to extend, extending and lowering the display into the viewing position; and to retract, retracting and raising the display into the storage position near the wall. Note that the auto straightening mechanism will automatically position the display evenly against the wall when the display is retracted/raised; and the mechanism for automatically adjusting the swivel position will automatically set the display in the preset swivel angle (preset with the set screw 162) whet the display is extended/lowered. Thus, the user may not need to get up to adjust the swivel position after the display is lowered.

For the convenience of viewing, the wall mount assembly 100 may be configured so that in the fully extended configuration the TV 110 is angled forward (top of the TV 100 is further away from the wall), for example, between 8 and 18 degrees; and in the fully retracted configuration the TV 110 is angled slightly forward, for example between 0 and 5 degrees.

The embodiments shown in the Figures and described in connection with the Figures include a linear actuator. As a person skilled in the art would understand after careful perusal of this document and the Figures, the mechanism for automatically adjusting azimuth may be used in embodiments without linear actuators, i.e., manually operated wall mount assemblies. As a person skilled in the art would also understand after careful perusal of this document and the Figures, the mechanism for automatically adjusting azimuth may be used in embodiments that do not include manual springs for extending/retracting the displays, i.e., embodiments where an actuator is used without gas springs; these embodiments may need to include a second linear actuator or a larger single actuator, to provide sufficient force for lifting the display. The inventor also contemplates embodiments with a single gas spring, with or without a linear actuator. More generally, the features described throughout this document may be present individually or in any combination or permutation, except where the presence or absence of specific elements/limitations is inherently required, explicitly indicated, or otherwise made clear from the context. Not every illustrated element is necessarily required in every embodiment in accordance with the concepts described in this document, while some elements that have not been specifically illustrated may be desirable in some embodiments in accordance with the concepts.

This document describes in detail the inventive wall mount assemblies. This was done for illustration purposes and, therefore, the foregoing description and the Figures are not necessarily intended to limit the spirit and scope of the invention(s) described. Neither the specific embodiments of the invention(s) as a whole, nor those of its (or their, as the case may be) features necessarily limit the general principles underlying the invention(s). The specific features described herein may be used in some embodiments, but not in others, without departure from the spirit and scope of the invention (s) as set forth herein. Various physical arrangements of components and various step sequences also fall within the intended scope of the invention(s). Many additional modifications are intended in the foregoing disclosure, and it will be appreciated by those of ordinary skill in the pertinent art that in some instances some features will be employed in the absence of a corresponding use of other features. The embodiments described above are illustrative and not necessarily limiting, although they or their selected features may be limiting for some claims. The illustrative examples therefore do not necessarily define the metes and bounds of the invention(s) and the legal protection afforded the invention(s).

What is claimed is:

1. A mounting device, comprising:
    a wall mounting portion configured to be attached to a wall;
    a display mounting portion; and
    an extending/contracting portion between the wall mounting portion and the display mounting portion;
    wherein:
    the display mounting portion is configured to receive and support a display so that the display faces away from the wall;
    the extending/contracting portion is configured to allow the display mounting portion to move up and towards the wall, and down and away from the wall;
    the display mounting portion is attached to the extending/contracting portion so that the display mounting portion can swivel horizontally; and
    the extending/contracting portion comprises an adjustably-extending component setting a predetermined azimuth of the display mounting portion and a biasing component configured to bias the display mounting portion against the adjustably-extending component at the predetermined azimuth;
    the adjustably-extending component and the biasing component automatically set the display mounting portion to a predetermined azimuth in response to the display mounting portion being lowered and moved away from the wall, and allow the display mounting portion to move towards a position parallel to the wall when the display mounting portion is raised and moved towards the wall.

2. The mounting device of claim 1, wherein:
    the extending/contracting portion comprises a front mounting bracket that does not swivel with the display mounting portion, the front mounting bracket comprising a first surface having portions defining a first hole on a first side off center of the first surface;

the mounting device further comprises at least one vertical center rod that attaches the display mounting portion to the front mounting bracket so that the display portion can swivel horizontally; and the adjustably-extending component extends through the first hole so that the adjustably-extending component can be adjusted to protrude through the first hole away from the wall at variable length that sets the predetermined azimuth.

3. The mounting device of claim 2, wherein:
the portions defining the first hole comprise a female thread; and
the adjustably-extending component comprises a set screw with a male thread matching the female thread of the first hole, so that the variable length of the adjustably-extending component protruding through the first hole can be adjusted by turning the set screw, thereby adjusting the predetermined azimuth.

4. The mounting device of claim 2, wherein:
the adjustably-extending component comprises a set screw and one or more nuts, so that the variable length of the adjustably-extending component protruding through the first hole can be adjusted by turning the set screw and the one or more nuts relative to each other, thereby adjusting the predetermined azimuth.

5. The mounting device of claim 2, further comprising a plurality of pegs with different lengths, each of the pegs of the plurality of pegs being insertable into and fixable in the first hole, wherein the adjustably-extending component comprises a selected peg of the plurality of pegs inserted into the first hole and fixed into the first hole, so that the variable length of the adjustably-extending component protruding through the first hole can be adjusted by selecting the selected peg, thereby adjusting the predetermined azimuth.

6. The mounting device of claim 2, wherein the biasing component comprises an elastic band having a first end attached to the front mounting bracket on the first side and a second end attached to the display mounting portion on the first side, the elastic hand being in extended state to bias the display mounting portion to swivel to the first side.

7. The mounting device of claim 2, wherein the biasing component comprises a spring having a first end attached to the front mounting bracket on the first side and a second end attached to the display mounting portion on the first side, the spring being in extended state to bias the display mounting portion to swivel to the first side.

8. The mounting device of claim 7, wherein the spring comprises a coil spring operating in tension mode.

9. The mounting device of claim 7, wherein the spring comprises a leaf spring.

10. The mounting device of claim 8, wherein the spring comprises a volute spring.

11. The mounting device of claim 7, wherein the spring comprises a V-spring.

12. The mounting device of claim 7, wherein the spring comprises a torsion spring.

13. The mounting device of claim 7, wherein the spring comprises a gas spring.

14. The mounting device of claim 7, wherein the first surface further comprises portions defining a second hole off center on a second side of the first surface, the second side being horizontally opposite to the first side.

15. The mounting device of claim 7, wherein the extending/contracting portion further comprises:
a lower arm comprising a first lower arm end and a second lower arm end;
an upper arm comprising a first upper arm end and a second upper arm end;
a wall mounting bracket rigidly attached to the wall mounting portion;
at least one gas spring to support the display mounting portion, the at least one gas spring comprising a first gas spring end and a second gas spring end; and
a linear actuator comprising a first actuator end and a second actuator end;
wherein the at least one gas spring and the linear actuator are arranged to retract and extend the display mounting portion selectively, and the lower arm comprises protrusions for automatically straightening the display mounting portion when the extending/contracting portion contracts to lower the display mounting portion.

16. The mounting device of claim 15, wherein:
the extending contracting portion further comprises a plurality of attachment axles;
the upper arm is attached to the wall mounting portion at the first upper arm end with at least a first attachment axle of the plurality of attachment axles to allow the upper arm to rotate around the first attachment axle when the display mounting portion is raised and lowered;
the lower arm is attached to the wall mounting portion at the first lower an end with at least a second attachment axle of the plurality of attachment axles to allow the lower arm to rotate around the first attachment axle when the display mounting portion is raised and lowered;
the upper arm is attached at the second upper arm end to the front mounting bracket with at least a third attachment axle of the plurality of attachment axles to allow the upper arm to rotate around the third attachment axle when the display mounting portion is raised and lowered; and
the lower arm is attached at the second lower arm end to the front mounting bracket with at least a fourth attachment axle of the plurality of attachment axles to allow the lower arm to rotate around the fourth attachment axle when the display mounting portion is raised and lowered.

17. The mounting device of claim 16, wherein:
the first actuator end is attached to the wall mounting portion at a first attachment point, and to the display mounting portion at a second attachment point;
the linear actuator can rotate around the first attachment point and rotate around the second attachment point when the display mounting portion is raised and lowered;
the first gas spring end is attached to the wall mounting portion at a third attachment point, and to the display mounting portion at a fourth attachment point; and
the at least one gas spring can rotate around the third attachment point and rotate around the fourth attachment point when the display mounting portion is raised and lowered.

18. The mounting device of claim 17, further comprising a remote control receiver configured to receive signals from a remote control unit and operate the linear actuator in response to the signals.

19. The mounting device of claim 18, further comprising the remote control unit, wherein the remote control receiver and the remote control unit are configured to operate using signals selected from the group consisting of radio frequency signals, infrared signals, and ultrasound signals.

20. A display mourning apparatus, comprising:
a wall mounting portion configured to be attached to a wall;
a display mounting portion configured to receive a display;
a means for extending and contracting the display mounting portion relative to the wall mounting portion, the means for extending and contracting being configured to move the display mounting portion up and towards the wall as the means for extending and contracting extends, and to move the display mourning portion lower and away from the wall as the means for extending and contracting contracts, the display mounting portion being attached to the means for extending and contracting so that the display mounting portion can swivel horizontally, the means for extending and contracting comprising an actuator and a means for automatically moving the display mounting portion to be parallel to the wall in response to the display mourning portion moving up and towards the wall; and
a means for moving the display mounting portion to a predetermined azimuth in response to the display mounting portion being lowered and moved away from the wall when the means for extending and contracting is contracted and allow the display mounting portion to move towards a position parallel to the wall when the display mounting portion is raised and moved towards the wall when the means for extending and contracting is extended.

21. The display mounting apparatus of claim 20, further comprising a means for remotely controlling the actuator.

* * * * *